(12) United States Patent
Kitajima

(10) Patent No.: US 7,589,765 B2
(45) Date of Patent: Sep. 15, 2009

(54) IMAGE PROCESSING APPARATUS, METHOD, AND COMPUTER PROGRAM

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 694 days.

(21) Appl. No.: 11/305,492

(22) Filed: Dec. 15, 2005

(65) Prior Publication Data
US 2006/0132870 A1  Jun. 22, 2006

(30) Foreign Application Priority Data
Dec. 17, 2004  (JP) .............................. 2004-366468

(51) Int. Cl.
  H04N 9/73 (2006.01)
  H04N 9/68 (2006.01)
(52) U.S. Cl. ..................... 348/227.1; 348/236; 348/234
(58) Field of Classification Search ............. 348/227.1, 348/225.1, 222.1, 223.1, 235, 234, 236, 237
See application file for complete search history.

(56) References Cited

U.S. PATENT DOCUMENTS

| | | | |
|---|---|---|---|
| 4,736,241 A * | 4/1988 | Murakami et al. ....... 348/225.1 |
| 5,282,022 A * | 1/1994 | Haruki et al. ............ 348/223.1 |
| 7,158,174 B2 * | 1/2007 | Gindele et al. .......... 348/224.1 |
| 2003/0058357 A1 * | 3/2003 | Aotsuka ..................... 348/272 |
| 2003/0169354 A1 * | 9/2003 | Aotsuka ..................... 348/272 |

FOREIGN PATENT DOCUMENTS

JP  5-64219  3/1993

* cited by examiner

Primary Examiner—Lin Ye
Assistant Examiner—Euel K Cowan
(74) Attorney, Agent, or Firm—Cowan, Liebowitz & Latman, P.C.

(57) ABSTRACT

An image processing apparatus comprises a light source presumption unit adapted to presume a light source on the basis of a plurality of feature information including illuminance information of first image signals obtained by image capturing, information of signals belonging to a hue region of a predetermined color among the first image signals, and information of a color temperature associated with second image signals obtained by image capturing before the first image signals; and a white balance control unit adapted to perform white balance control in accordance with light source information presumed by the light source presumption unit.

15 Claims, 17 Drawing Sheets

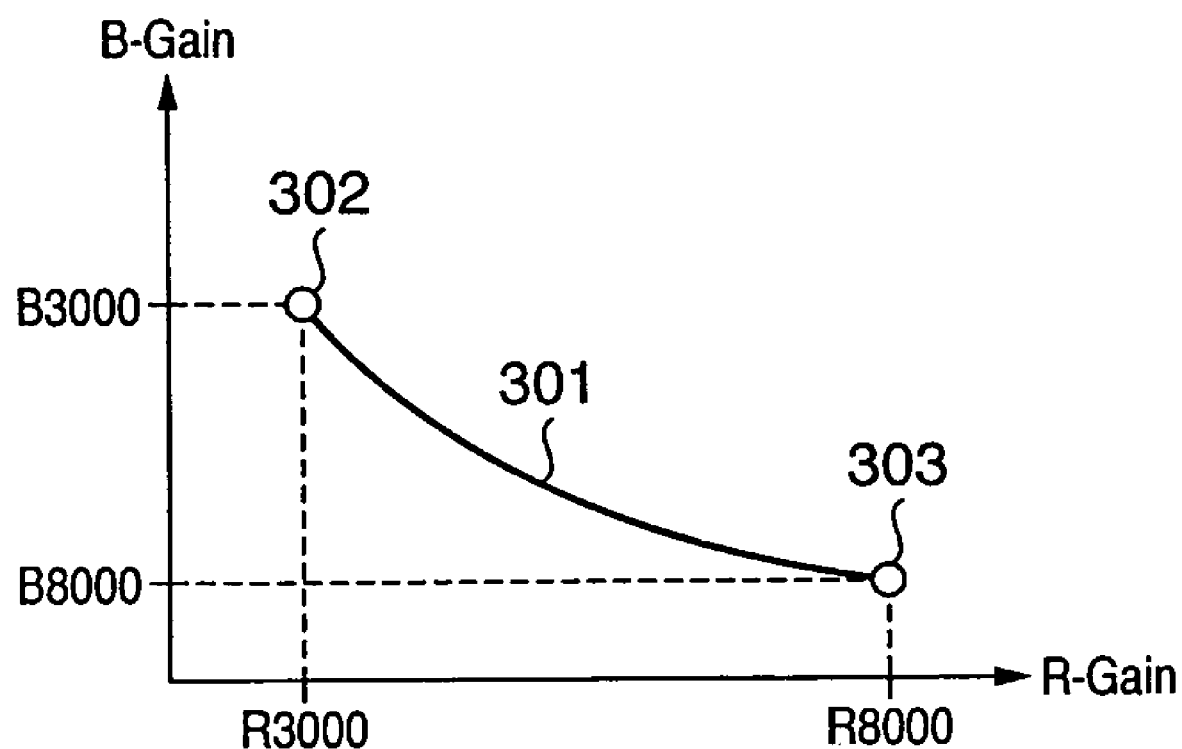
F I G. 3

BEFORE CHANGE

AFTER CHANGE

F I G. 16
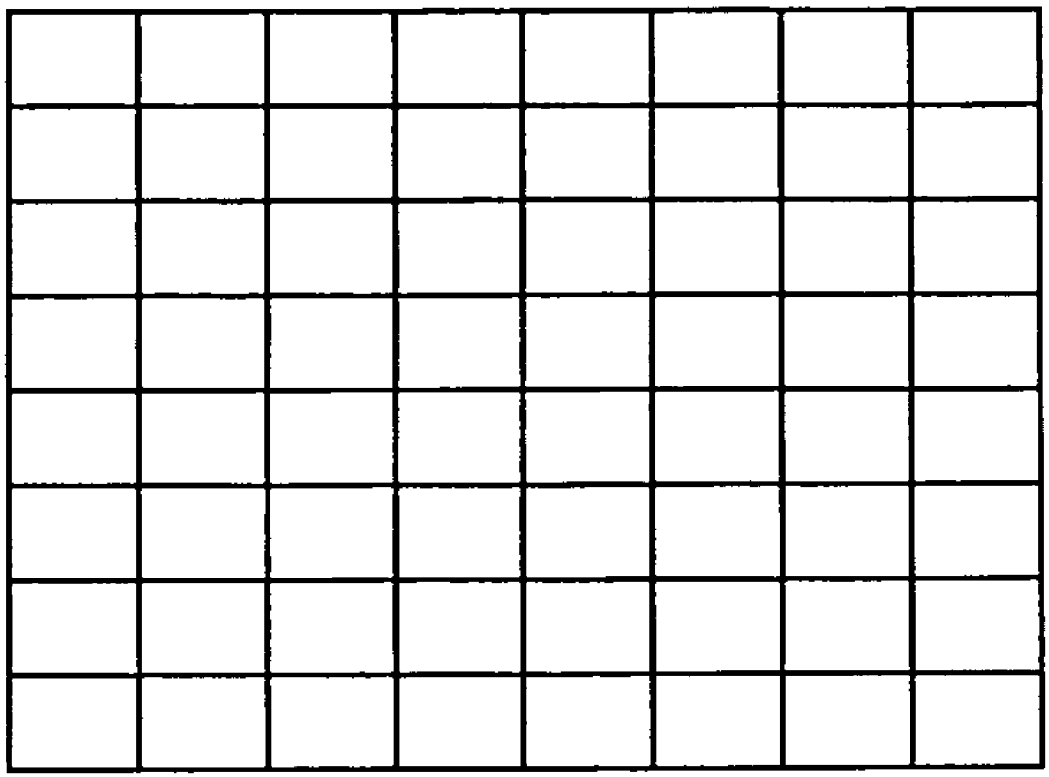

SUNLIGHT
(OUTDOOR)

ARTIFICIAL LIGHT
(INDOOR)

IMAGE PROCESSING APPARATUS, METHOD, AND COMPUTER PROGRAM

FIELD OF THE INVENTION

The present invention relates to an image processing apparatus, method, and computer program which presume a light source and perform proper white balance control.

BACKGROUND OF THE INVENTION

Popular auto white balance control used in recent video cameras and the like is executed not using any external sensor but using an output from an image capturing element. As an example of white balance control of this type, color difference signals (R-Y and B-Y) are obtained from a luminance signal (Y) and red (R), green (G), and blue (B) color signals. Image data is divided into small blocks, signals are averaged in each divided block, and color signal components of almost white are extracted from the averages. The white balance is so controlled as to adjust the average of the extracted color signals of almost to be equal to a target white value (e.g., Japanese Patent Laid-Open No. 5-64219).

In white balance control of this type, it is known to presume a light source on the basis of illuminance information of an object. Generally, the illuminance of an object tends to represent a relatively large numerical value under outdoor sunlight and a relatively small numerical value under an indoor artificial light. From this, it can be presumed from the illuminance of an object to a certain degree whether the light source is outdoor sunlight or an indoor artificial light such as a fluorescent lamp. It is presumed that the light source is an outdoor one when the illuminance of an object is higher than a predetermined threshold and an indoor one when the illuminance is smaller. The white balance gain is determined in accordance with the light source information (indoor/outdoor).

FIGS. 17A and 17B are graphs each showing a white extraction range corresponding to the type of light source. In FIGS. 17A and 17B, reference numeral 1700 denotes a white extraction range on the color difference plane. A luminance signal which is larger than a predetermined threshold and falls within the white extraction range is extracted. The white extraction range is corrected so that a blue-based color is determined to be achromatic, as shown in FIG. 17A, when light source information represents an outdoor light source, and a red-based color corresponding to a halogen lamp and a green-based color corresponding to an artificial light are determined to be achromatic, as shown in FIG. 17B, when light source information represents an indoor light source. White data is extracted using the white extraction range corresponding to the type of light source. The white balance gains of red (R) and blue (B) signals are so determined as to adjust the extracted white data to the target white value. Then, white balance control is executed.

As described above, whether the light source is an outdoor or indoor one is presumed on the basis of illuminance information. In this case, when the object is photographed at a dark outdoor place, e.g., in the shade, the scene may be misjudged as an indoor one. This is because the distributions of outdoor light and indoor light partially overlap each other in a threshold process based on only the illuminance and light sources cannot be discriminated by only the threshold of a linear characteristic.

When green vegetation or a green lawn is photographed in the outdoor shade, the white extraction range contains the green region, and the function of changing green to white (achromatic color) acts. If a picture is taken in this state, the object which is originally white is photographed in magenta, and green of vegetation and a lawn changes to gray, failing in proper white balance control.

SUMMARY OF THE INVENTION

The present invention has been made in consideration of the above situation, and has as its object to increase the precision of light source presumption and perform proper white balance control.

An image processing apparatus according to the present invention comprises a light source presumption unit adapted to presume a light source on the basis of a plurality of feature information including illuminance information of first image signals obtained by image capturing, information of signals belonging to a hue region of a predetermined color among the first image signals, and information of a color temperature associated with second image signals obtained by image capturing before the first image signals; and a white balance control unit adapted to perform white balance control in accordance with light source information presumed by the light source presumption unit.

An image processing method according to the present invention comprises a light source presumption step of presuming a light source on the basis of a plurality of feature information including illuminance information of first image signals obtained by image capturing, information of signals belonging to a hue region of a predetermined color among the first image signals, and information of a color temperature associated with second image signals obtained by image capturing before the first image signals; and a white balance control step of performing white balance control in accordance with light source information presumed in the light source presumption step.

A computer program according to the present invention causes a computer to execute a presumption process of presuming a light source on the basis of a plurality of feature information including illuminance information of first image signals obtained by image capturing, information of signals belonging to a hue region of a predetermined color among the first image signals, and information of a color temperature associated with second image signals obtained by image capturing before the first image signals, and a control process of performing white balance control in accordance with light source information presumed in the light source presumption process.

According to the present invention, a light source is presumed on the basis of a plurality of feature information including illuminance information of an input image. The precision of light source presumption can be increased, and appropriate white balance control can be implemented. In particular, a light source presumption process is simplified when a light source is presumed on the basis of the relationship between a plurality of feature information including illuminance information and the feature distribution of each light source in a multidimensional coordinate system whose coordinate axes are these a plurality of feature information including illuminance information.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a graph showing the control range of the white balance gain;

FIG. 16 is a view showing the division frame of an image signal; and

DETAILED DESCRIPTION OF THE PREFERRED EMBODIMENTS

Preferred embodiments of the present invention will be described below with reference to the accompanying drawings.

First Embodiment

Figure 1:
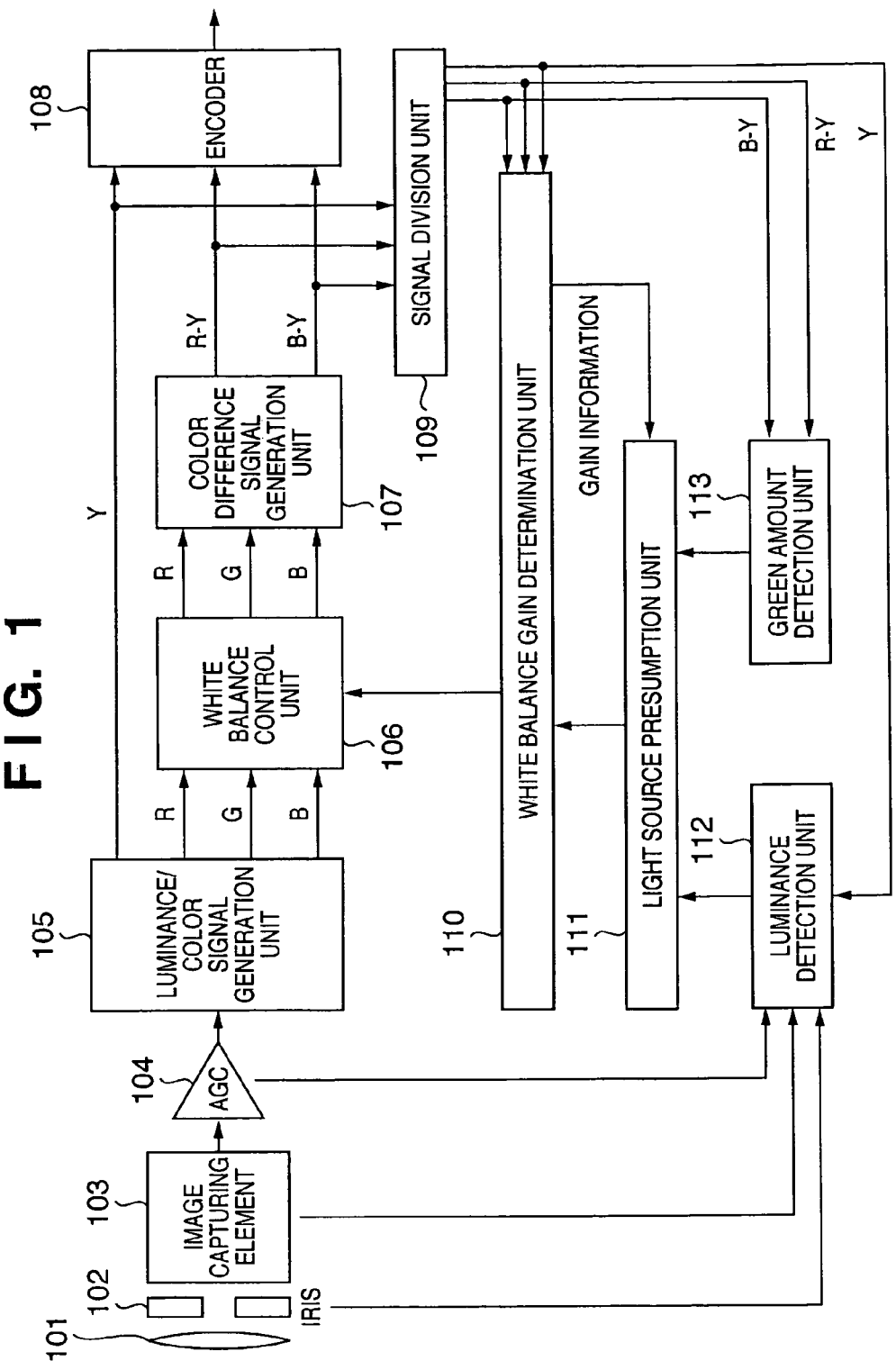
FIG. 1 is a block diagram showing the configuration of an image processing apparatus according to the first embodiment.

FIG. 1 is a block diagram showing an example of the configuration of an image processing apparatus having an auto white balance function according to the first embodiment. In FIG. 1, reference numeral 101 denotes a lens which forms an object beam into an image; 102, an iris; 103, an image capturing element which photoelectrically converts incident light; and 104, an AGC amplifier which amplifies a signal from the image capturing element 103 into a proper level.

Reference numeral 105 denotes a luminance/color signal generation unit which converts a signal generated by the image capturing element 103 into a luminance signal (Y) and color signals (R, G, and B); 106, a white balance control unit which controls the gains of the color signals (R, G, and B) output from the luminance/color signal generation unit 105 and controls the white balance; 107, a color difference signal generation unit which generate color difference signals (R-Y and B-Y); and 108, an encoder which converts the color difference signals into a standard television signal or the like.

Reference numeral 109 denotes a signal division unit which divides the luminance signal (Y) and color difference signals (R-Y and B-Y) into predetermined regions.

Reference numeral 113 denotes a green amount detection unit which detects the amount of signals belonging to the green hue region among image signals; 112, a luminance detection unit which detects the illuminance of an object; 111, a light source presumption unit which presumes a light source; and 110, a white balance gain determination unit which determines a white balance gain on the basis of signals obtained from the signal division unit 109 and light source information from the light source presumption unit 111.

Process operation in the image processing apparatus according to the first embodiment will be explained. Light incident on the image capturing element 103 is photoelectrically converted, the signal is amplified to a proper level by the AGC amplifier 104, and the amplified signal is output to the luminance/color signal generation unit 105. The luminance/color signal generation unit 105 generates a luminance signal (Y) and color signals (R, G, and B), and outputs the color signals (R, G, and B) to the white balance control unit 106.

The white balance control unit 106 adjusts the gains of the color signals (R, G, and B) on the basis of white balance gain information output from the white balance gain determination unit 110 (to be described later), and outputs the gain-adjusted color signals (R, G, and B) to the color difference signal generation unit 107. The color difference signal generation unit 107 generates color difference signals (R-Y and B-Y) from the color signals (R, G, and B), and outputs the color difference signals (R-Y and B-Y) to the encoder 108 and signal division unit 109.

The encoder 108 generates a standard television signal such as NTSC from the luminance signal (Y) and color difference signals (R-Y and B-Y), and outputs the standard television signal.

The signal division unit 109 divides an image signal into blocks (e.g., 8×8 regions), as shown in FIG. 16. The signal division unit 109 calculates the averages of the luminance signal (Y) and color difference signals (R-Y and B-Y) in each block. The signal division unit 109 outputs the luminance signal (Y) and color difference signals (R-Y and B-Y) to the white balance gain determination unit 110, the color difference signals (R-Y and B-Y) to the green amount detection unit 113, and the luminance signal (Y) to the luminance detection unit 112.

In addition to the average luminance signal (Y) of each block from the signal division unit 109, the luminance detection unit 112 receives a signal representing the full-aperture state of the iris 102, a signal representing the control state of the electronic shutter of the image capturing element 103, and a signal representing the gain state of the AGC amplifier 104.

The luminance detection unit 112 detects the luminance (illuminance) of the object from the luminance, the full-aperture state of the iris, the gain state of the AGC amplifier 104, and the electronic shutter state of the image capturing element 103. The luminance detection unit 112 outputs the detected illuminance information to the light source presumption unit 111.

Figure 2:
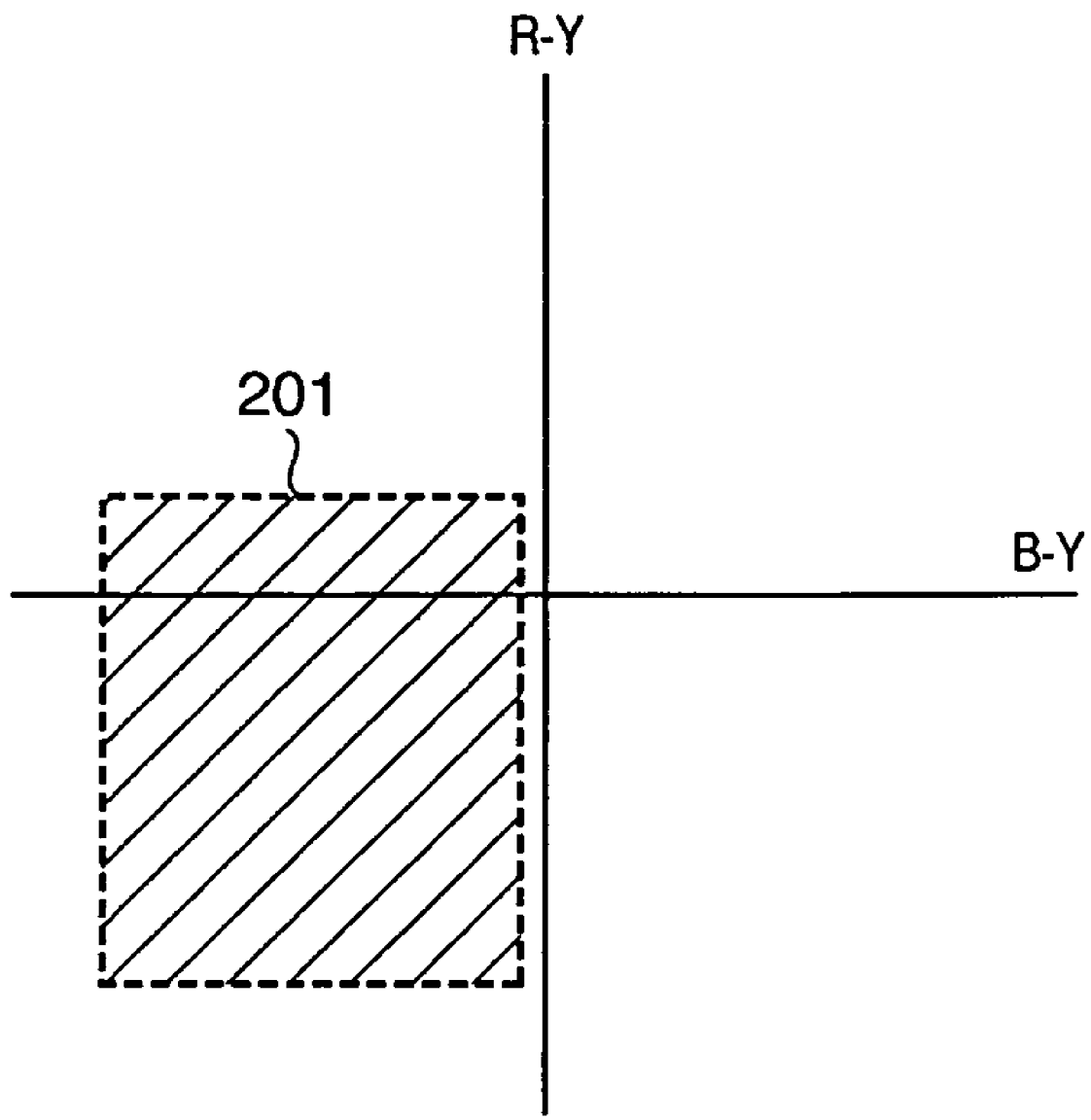
FIG. 2 is a graph showing the green region on the color difference plane.

The green amount detection unit 113 receives the average color difference signals (R-Y and B-Y) of each block from the signal division unit 109. FIG. 2 is a graph showing the plane of color differences (R-Y and B-Y). Reference numeral 201 denotes a green region (region corresponding to a hue from yellow to green). The green amount detection unit 113 checks whether the input average color difference signals of each block fall within the green region 201 on the color difference plane. The green amount detection unit 113 counts the number of blocks contained in the green region 201 (the number of blocks determined to be green will be referred to as "green amount" hereinafter). The green amount detection unit 113 outputs the obtained green amount to the light source presumption unit 111.

The white balance gain determination unit 110 extracts signals of almost white from the average luminance signal (Y) and average color difference signals (R-Y and B-Y) of each block from the signal division unit 109, and determines the white balance gains of the red (R) and blue (B) signals so as to adjust the extracted signals of almost white to the target white value. FIG. 3 is a graph showing the control range of the white balance gain. In FIG. 3, reference numeral 301 denotes a blackbody radiation axis. The white balance gain is basically determined in accordance with the blackbody radiation axis 301. Reference numeral 302 denotes a gain state when the color temperature is 3000 K. In this example, the red gain (R-Gain) is controlled to R3000, and the blue gain (B-Gain) is controlled to B3000. Reference numeral 303 denotes a gain state when the color temperature is 8000 K. In this state, the red gain is controlled to R8000, and the blue gain is controlled to B8000. That is, the gain is controlled in accordance with the color temperature of the light source along the blackbody radiation axis 301 toward the gain state 303 for a high color temperature and the gain state 302 for a low color temperature. The white balance gain determination unit 110 outputs white balance gain information to the white balance control unit 106 and light source presumption unit 111.

Figure 4:
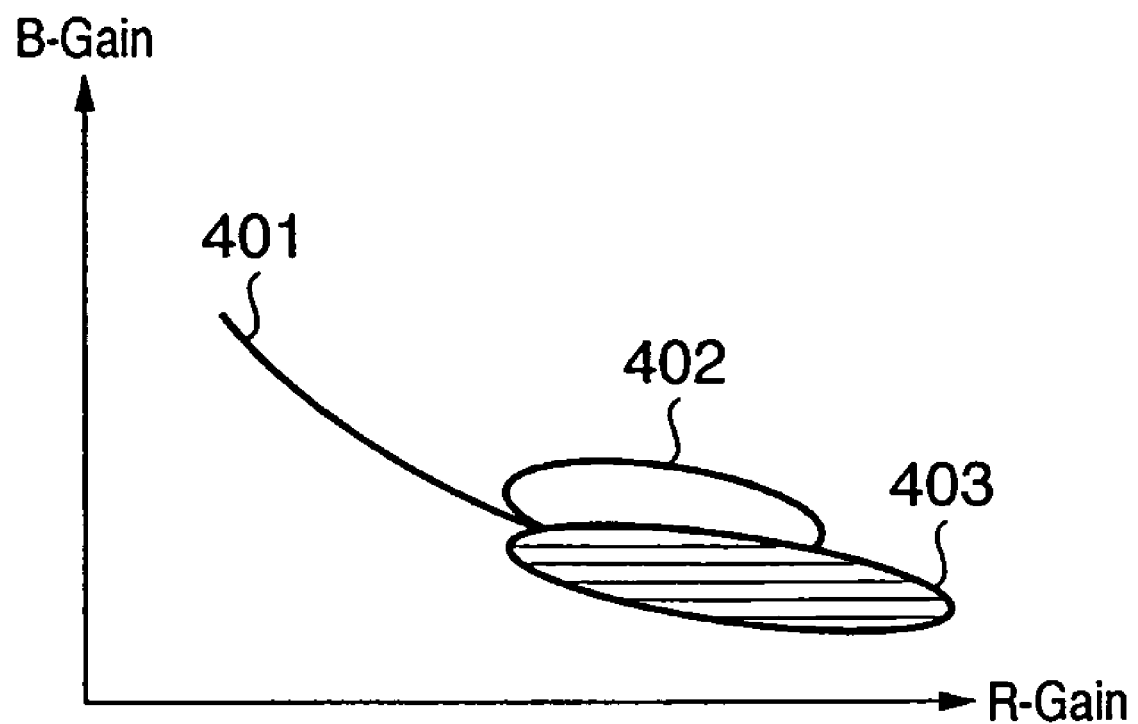
FIG. 4 is a graph showing the distributions of two types of light sources (indoor fluorescent lamp and outdoor sunshine/shade) in a white balance gain coordinate system of red and blue.

The light source presumption unit 111 receives object illuminance information from the luminance detection unit 112, a green amount from the green amount detection unit 113, and white balance gain information from the white balance gain determination unit 110, and presumes a light source. As the white balance gain information, the light source presumption unit 111 receives a red gain (R-Gain) used to correct the white balance of an image signal of a frame before the current frame to be corrected. FIG. 4 is a graph showing the distributions of two types of light sources (indoor fluorescent lamp and outdoor sunshine/shade) in a white balance gain coordinate system of red and blue. In FIG. 4, reference numeral 401 denotes a blackbody radiation axis; 402, a region where white balance gains under the indoor fluorescent lamp are distributed; and 403, a region where white balance gains in the outdoor sunshine/shade are distributed. As for the red gain (R-Gain), the distribution region for the indoor sunshine/shade widens toward a high color temperature. In other words, when the color temperature is high, the light source is an outdoor one at high possibility. In this case, the red gain (R-Gain) is set as one of inputs to the light source presumption unit 111 in order to index the color temperature state.

Figure 5:
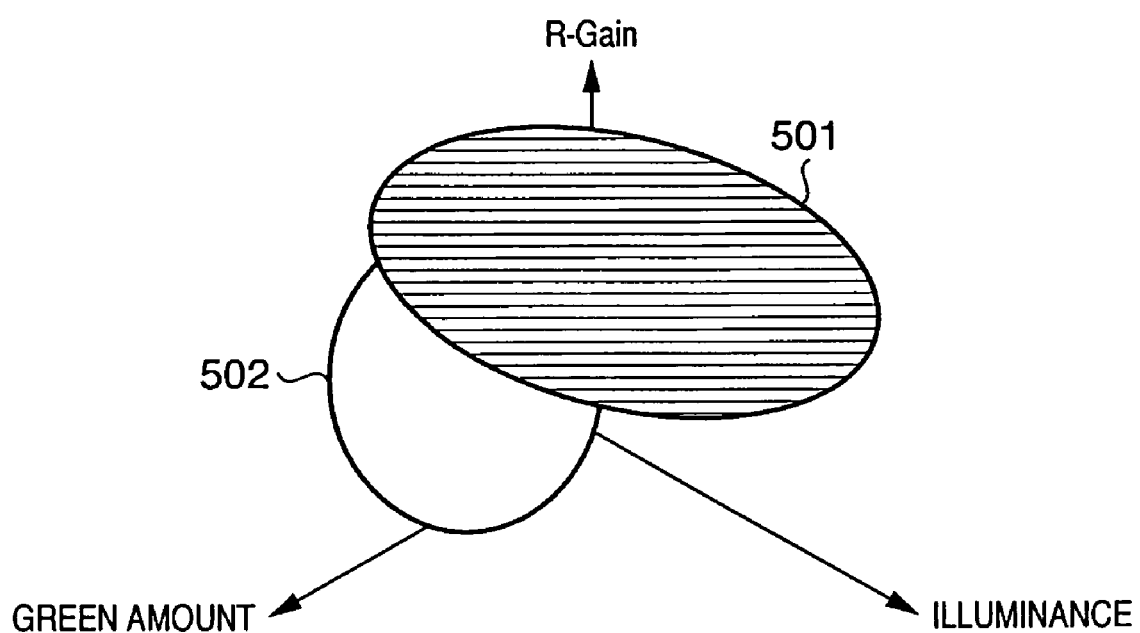
FIG. 5 is a graph showing the distributions of outdoor light and indoor light in a three-dimensional coordinate system whose coordinate axes are the illuminance, green amount, and R-Gain.

Light source presumption based on three types of feature information, i.e., the illuminance, green amount, and R-Gain will be explained. FIG. 5 is a graph showing the distributions of outdoor light and indoor light in a three-dimensional coordinate system whose coordinate axes are the illuminance, green amount, and R-Gain. In FIG. 5, reference numeral 501 denotes a distribution for the outdoor sunshine/shade; and 502, a distribution for the indoor fluorescent lamp.

Figure 6:
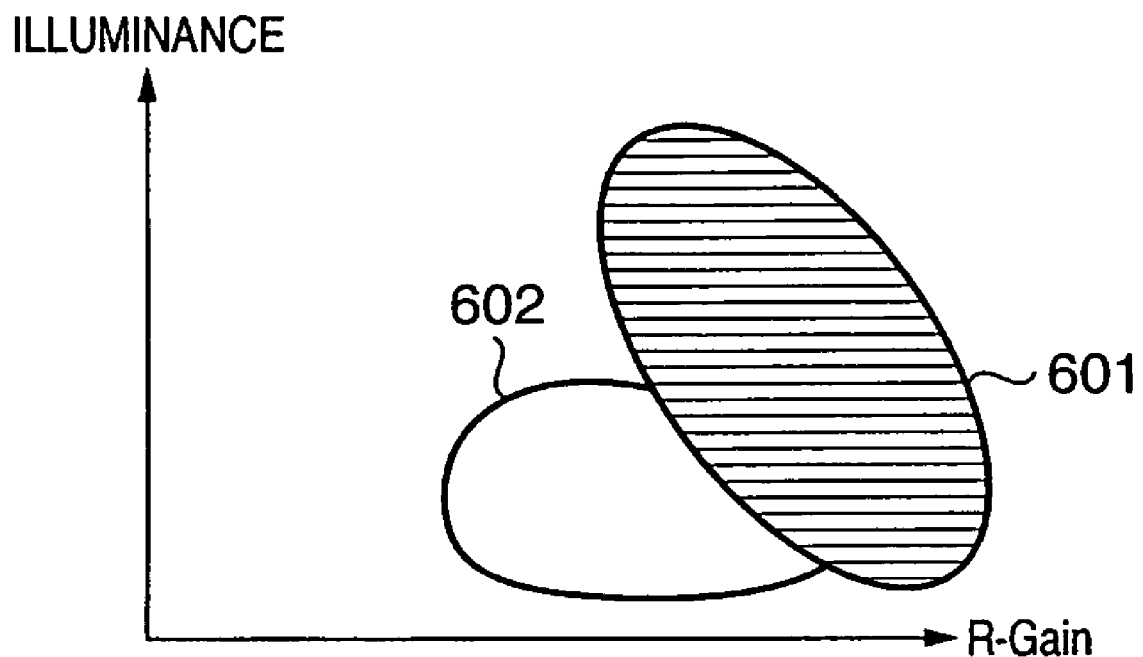
FIG. 6 is a graph showing the distributions of outdoor light and indoor light in a coordinate system whose coordinate axes are R-Gain and the illuminance.
Figure 7:
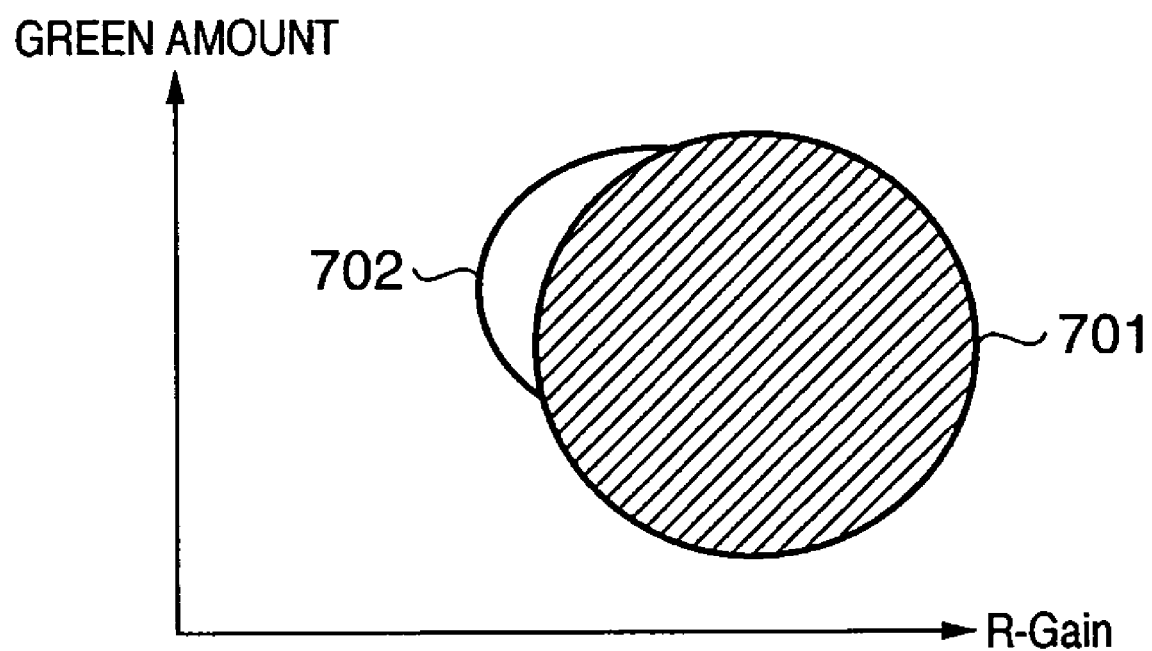
FIG. 7 is a graph showing the distributions of outdoor light and indoor light in a coordinate system whose coordinate axes are R-Gain and the green amount.

FIGS. 6 and 7 are graphs each showing a distribution based on two coordinate axes of the three-dimensional coordinate system in FIG. 5. FIG. 6 is a graph showing the relationship between R-Gain and the illuminance. In FIG. 6, reference numeral 601 denotes a distribution for the outdoor sunshine/shade; and 602, a distribution for the indoor fluorescent lamp. FIG. 7 is a graph showing the relationship between R-Gain and the green amount. In FIG. 7, reference numeral 701 denotes a distribution for the outdoor sunshine/shade; and 702, a distribution for the indoor fluorescent lamp.

Figure 8:
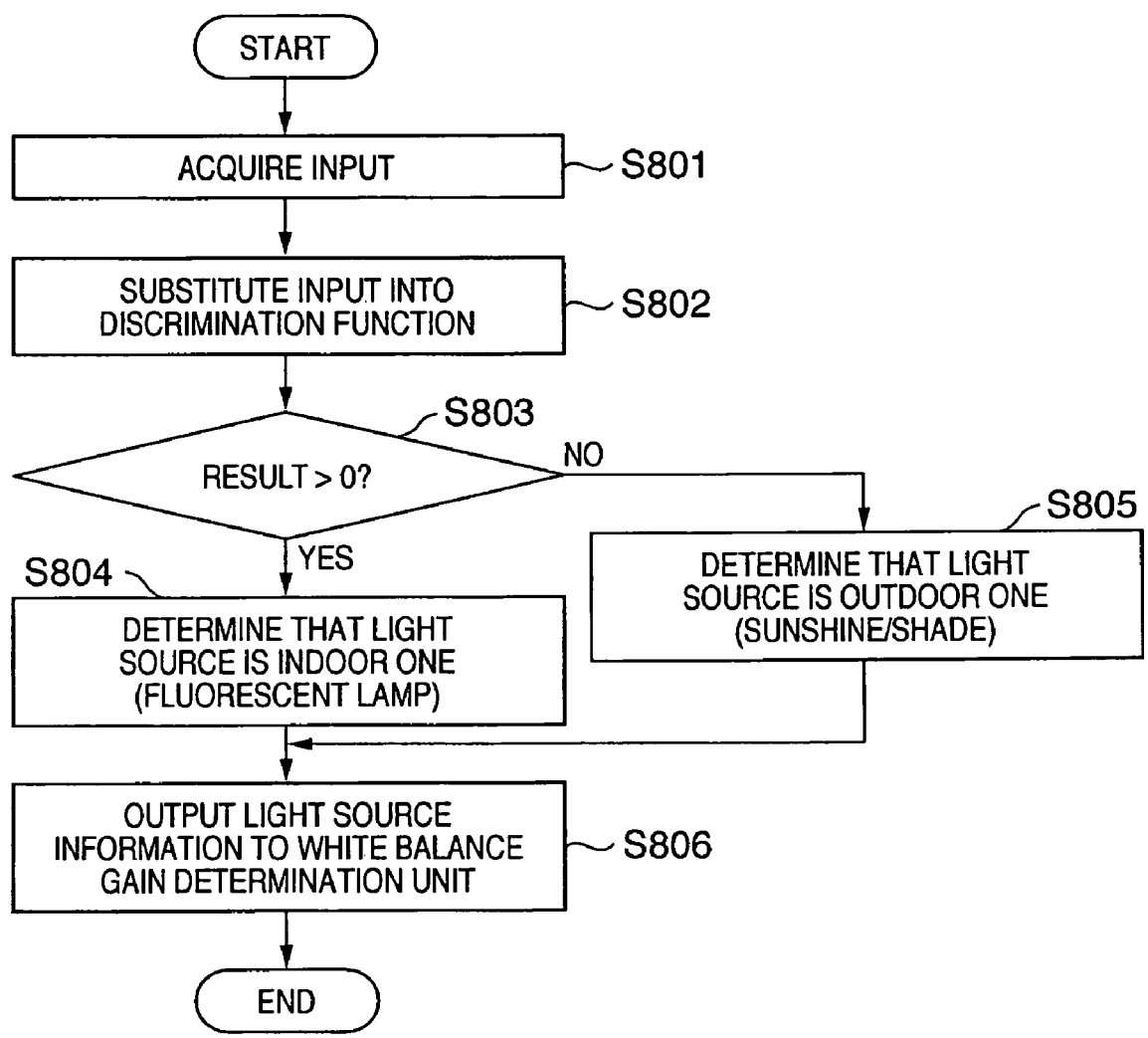
FIG. 8 is a flowchart for explaining a light source presumption process.
Figure 9:
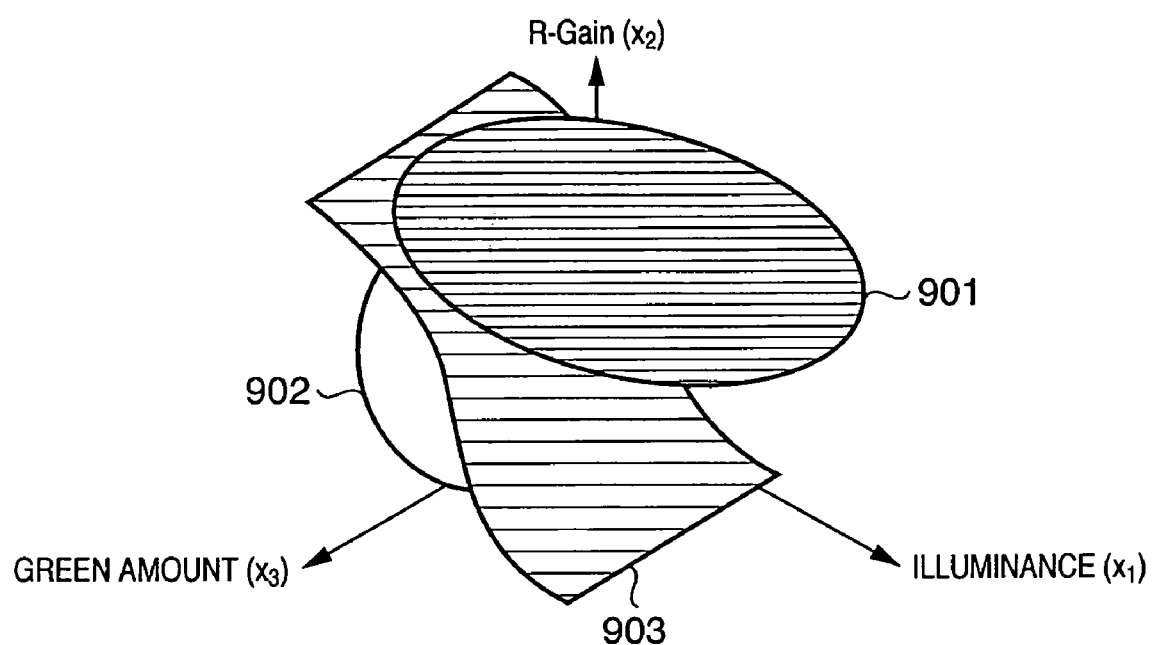
FIG. 9 is a graph showing the distributions of outdoor light and indoor light in a three-dimensional coordinate system whose coordinate axes are the illuminance, green amount, and R-Gain.

FIG. 8 is a flowchart for explaining a light source presumption process in the light source presumption unit 111. The light source presumption unit 111 acquires the illuminance, green amount, and R-Gain as input information (step S801). The input information acquired in step S801 is substituted into a discrimination function (step S802). The discrimination function will be explained with reference to FIG. 9. FIG. 9 shows a three-dimensional coordinate system whose coordinate axes are the illuminance, green amount, and R-Gain, similar to FIG. 5. In FIG. 9, reference numeral 901 denotes a distribution for the outdoor sunshine/shade; and 902, a distribution for the indoor fluorescent lamp. Reference numeral 903 denotes a discrimination boundary which is a surface boundary to statistically divide the outdoor distribution 901 and indoor distribution 902.

A formula which expresses the discrimination boundary 903 is a discrimination function. In the first embodiment, a discriminant analysis is done for the distributions of outdoor and indoor data in the three-dimensional coordinate system whose coordinate axes are the illuminance, green amount, and R-Gain. As a result, a quadratic discrimination function based on a Maharanobis' generalized distance is attained. A discrimination function $f(x_1,x_2,x_3)$ is given by equation (1) using an input illuminance $(x_1)$, R-Gain $(x_2)$, and green amount $(x_3)$ as variables. A surface expressed by $f(x_1,x_2,x_3)=0$ corresponds to the discrimination boundary 903.

$$f(x_1, x_2, x_3) = \alpha_0 x_1^2 + \alpha_1 x_1 x_2 + \alpha_2 x_1 x_3 + \\ \alpha_3 x_1 + \alpha_4 x_2^2 + \alpha_5 x_2 x_3 + \alpha_6 x_2 + \alpha_7 x_3^2 + \alpha_8 x_3 + \alpha_9 \quad (1)$$

where $\alpha_0$ to $\alpha_9$: constants (determined by performing a discriminant analysis in accordance with the indoor or outdoor distribution)

The illuminance $(x_1)$, R-Gain $(x_2)$, and green amount $(x_3)$ are substituted into the discrimination function $f(x_1,x_2,x_3)$. If the discrimination function $f(x_1,x_2,x_3)>0$, it is determined that the light source is the indoor fluorescent lamp (step S804). If the discrimination function $f(x_1,x_2,x_3)<0$, it is determined that the light source is the outdoor sunshine/shade (step S805). This is equivalent to a process of plotting a feature point in the three-dimensional coordinate system of FIG. 9, and determining whether the plotted point is spatially on the outdoor or indoor side from the discrimination boundary 903.

After that, the light source presumption unit 111 outputs light source information to the white balance gain determination unit 110 (step S806). The above process is the light source presumption process by the light source presumption unit 111.

As described above, the white balance gain determination unit 110 determines the white balance gain by adaptively correcting the white extraction range in accordance with light source information. The determined white balance gain is output as white balance gain information to the white balance control unit 106, and to the light source presumption unit 111 so as to utilize the white balance gain for control of the next image. Since the white balance apparatus according to the first embodiment performs feedback control, the set white balance gain is adapted to the next input image signal.

As described above, the two, outdoor and indoor light source distributions are discriminated by a nonlinear boundary which divides a three-dimensional distribution based on the illuminance, green amount, and R-Gain. The light source can be presumed at higher precision than in a conventional method of performing a threshold process for the illuminance to discriminate outdoor and indoor light sources.

In the first embodiment, a Maharanobis' generalized distance boundary obtained by a discriminant analysis is defined as a discrimination boundary for the discrimination function. However, the discrimination boundary is not limited to this, and any boundary can be employed as far as it can express a boundary (which may be approximation by a polyhedral boundary) which nonlinearly divides a three-dimensional coordinate system.

Figure 10:
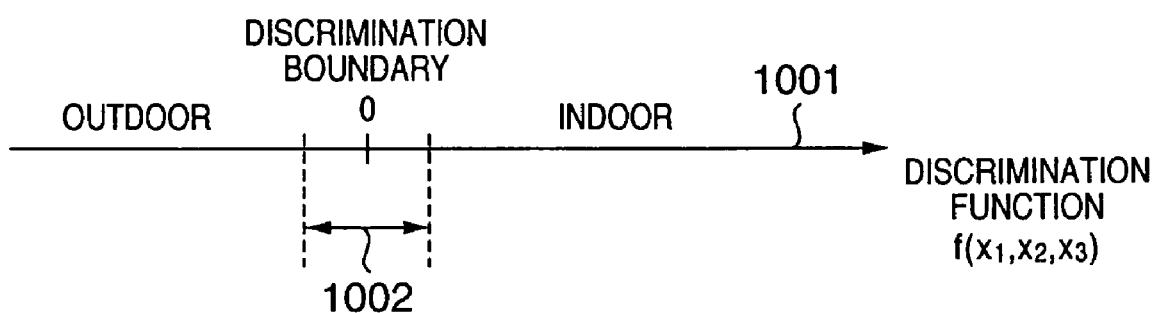
FIG. 10 is a graph for explaining an example of control based on the result of a discrimination function.

The light source is determined by checking whether the result of the discrimination function is positive or negative. However, control may be changed stepwise in accordance with the distance from the discrimination boundary. For example, in FIG. 10, an abscissa axis 1001 represents the discrimination function. In the first embodiment, the light source is determined to be an indoor one when the result of the discrimination function is positive from a discrimination boundary of 0, and an outdoor one when the result is negative. Then, the white balance gain is corrected (for example, the white extraction range is controlled). In this case, in order to prevent any determination error near the discrimination boundary of 0, control may be added to, e.g., weaken correction of the white extraction range that is performed depending on the type of light source when the result falls within a properly set range 1002. Alternatively, the control method may be changed depending on the difference from the discrimination boundary of 0

Second Embodiment

Figure 11:
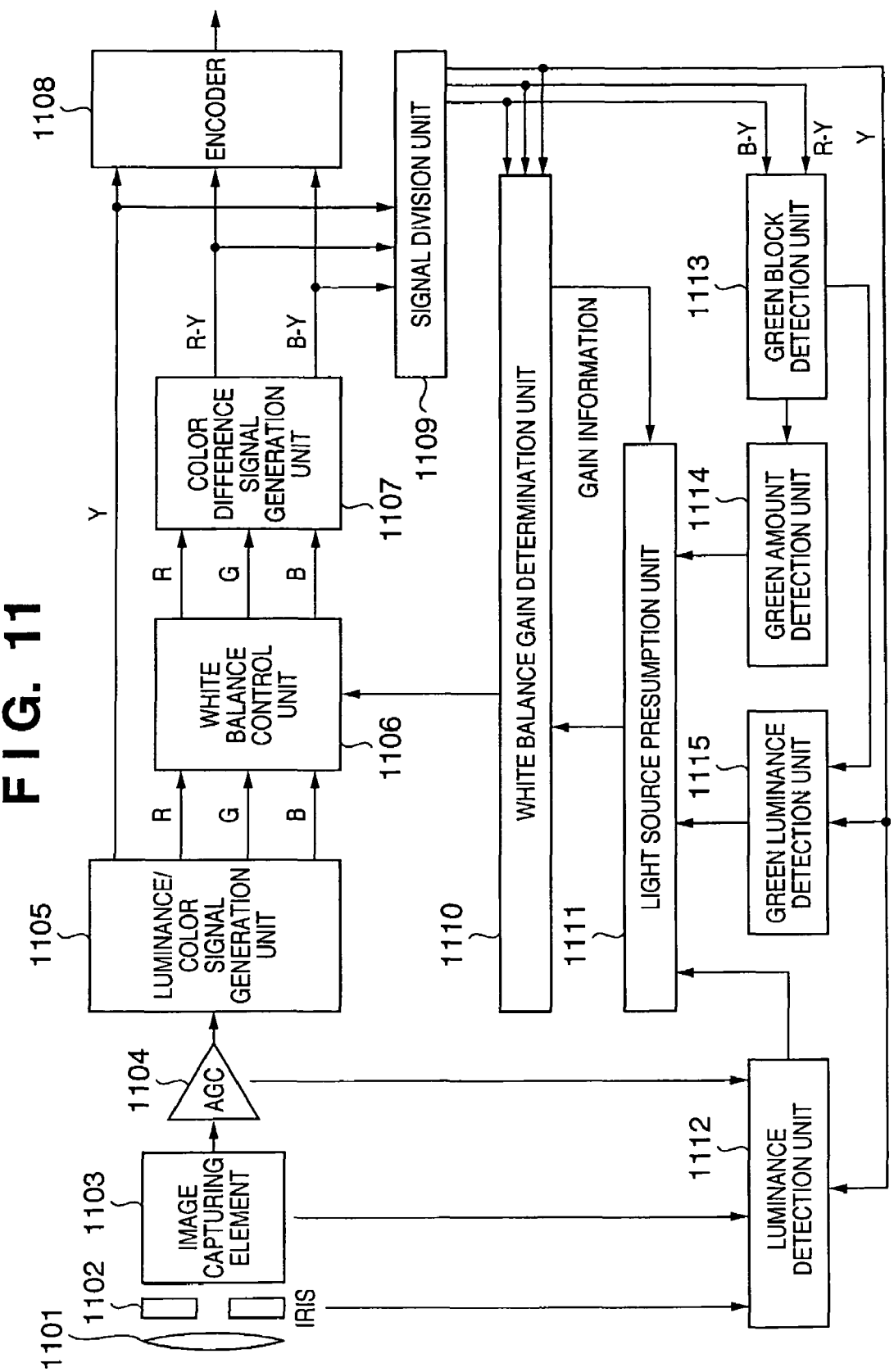
FIG. 11 is a block diagram showing the configuration of an image processing apparatus according to the second embodiment.

The second embodiment is directed to an example in which three types of feature information used for light source presumption in the first embodiment are expanded to four types of feature information. FIG. 11 is a block diagram showing an example of the configuration of an image processing apparatus according to the second embodiment. In FIG. 11, building components from a lens 1101 to a signal division unit 1109 are identical to those from the lens 101 to the signal division unit 109 in FIG. 1 according to the first embodiment, and a detailed description thereof will be omitted.

Reference numeral 1113 denotes a green block detection unit which checks whether the signal of each block belongs to the green hue region; 1114, a green amount detection unit which counts the number of blocks determined by the green block detection unit 1113 to be green; 1115, a green luminance detection unit which calculates the average luminance of blocks determined by the green block detection unit 1113 to be green; 1112, a luminance detection unit which detects the illuminance of an object; 1111, a light source presumption unit which presumes a light source; and 1110, a white balance gain determination unit which determines a white balance gain on the basis of signals obtained from the signal division unit 1109 and light source information from the light source presumption unit 1111.

Process operation in the image processing apparatus according to the second embodiment will be explained. A process till an image signal generated by the image capturing element 1103 is converted into the averages of the luminance signal (Y) and color difference signals (R-Y and B-Y) for each region and these signals are output as block signals from the signal division unit 1109, and a process till the luminance of an object is detected by the luminance detection unit 1112 are the same as those described in the first embodiment, and a description thereof will be omitted.

The green block detection unit 1113 receives the average color difference signals (R-Y and B-Y) of each block from the signal division unit 1109. The green block detection unit 1113 checks whether the input average color difference signals (R-Y and B-Y) fall within a green region (region corresponding to a hue from yellow to green) 201 shown in FIG. 2. The green block detection unit 1113 outputs block information contained in the green region 201 to the green amount detection unit 1114 and green luminance detection unit 1115.

The green amount detection unit 1114 counts the number of blocks contained in the green region 201, and outputs the count as a green amount to the light source presumption unit 1111.

The green luminance detection unit 1115 acquires the luminance values (Y) of blocks contained in the green region 201, calculates the average of the luminances of all blocks contained in the green region 201, and outputs the average as an average green block luminance to the light source presumption unit 1111.

The light source presumption unit 1111 presumes a light source from four types of feature information: the illuminance, green amount, and R-Gain described in the first embodiment, and in addition the average green block luminance from the green luminance detection unit 1115. Outdoor green is green of vegetation and a lawn, and tends to have a relatively high color saturation and a low luminance. To the contrary, indoor green has a relatively high luminance, is attained by reflecting light from a fluorescent lamp by an object of almost white, and thus tends to have a low color saturation and high luminance. By adding the average green block luminance to feature information of light source presumption, the precision of light source presumption can be increased.

Figure 12:
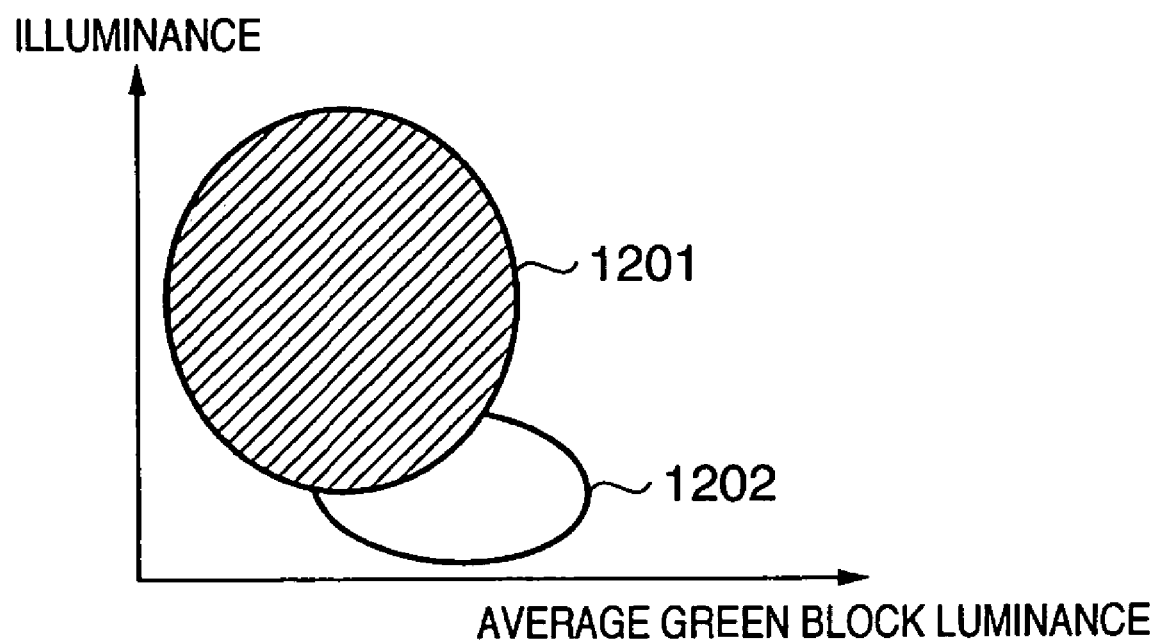
FIG. 12 is a graph showing the distributions of outdoor light and indoor light in a coordinate system whose coordinate axes are the average green block luminance and illuminance.

FIG. 12 is a graph showing the relationship between the illuminance and the average green block luminance. In FIG. 12, reference numeral 1201 denotes a distribution for the outdoor sunshine/shade; and 1202, a distribution for the indoor fluorescent lamp.

A light source presumption process by the light source presumption unit 1111 executes discrimination using a discrimination function, similar to the first embodiment. This process is different from that in the first embodiment in that the process uses a discrimination function in a four-dimensional coordinate system (not shown) whose coordinate axes are four types of feature information: the illuminance, R-Gain, green amount, and average green block luminance. More specifically, a discrimination function representing a discrimination boundary between indoor and outdoor light sources in a four-dimensional coordinate system is prepared, and a light source is presumed from a result of substituting feature information into the discrimination function. For the discrimination function, a discriminant analysis is done for the distributions of outdoor and indoor data on the four-dimensional coordinate system, similar to the first embodiment, and a quadratic discrimination function based on the Maharanobis' generalized distance is obtained. A discrimination function $f(x_1,x_2,x_3,x_4)$ is given by equation (2) using an input illuminance $(x_1)$, R-Gain $(x_2)$, green amount $(x_3)$, and average green block luminance $(x_4)$ as variables. A surface expressed by $f(x_1,x_2,x_3,x_4)=0$ corresponds to the discrimination boundary, similar to the first embodiment.

$$f(x_1, x_2, x_3, x_4) = \\ \alpha_0 x_1^2 + \alpha_1 x_1 x_2 + \alpha_2 x_1 x_3 + \alpha_3 x_1 x_4 + \alpha_4 x_1 + \alpha_5 x_2^2 + \alpha_6 x_2 x_3 + \\ \alpha_7 x_2 x_4 + \alpha_8 x_2 + \alpha_9 x_3^2 + \alpha_{10} x_3 x_4 + \alpha_{11} x_3 + \alpha_{12} x_4^2 + \alpha_{13} x_4 + \alpha_{14}$$

(2)

where $\alpha_0$ to $\alpha_{14}$: constants (determined by performing a discriminant analysis in accordance with the indoor or outdoor distribution)

The illuminance $(x_1)$, R-Gain $(x_2)$, green amount $(x_3)$, and average green block luminance $(x_4)$ are substituted into the discrimination function $f(x_1,x_2,x_3,x_4)$. The light source is determined from whether the result of the discrimination function $f(x_1,x_2,x_3,x_4)$ is positive or negative. The white balance gain determination unit 1110 controls the white extraction range and the like on the basis of light source information serving as the determination result, similar to the first embodiment.

In the first and second embodiments, discrimination in the three- or four-dimensional coordinate system is executed. However, the number of dimensions is not limited to three or four, and a multidimensional coordinate system (multidimensional feature space) prepared by adding, e.g., the average green block color saturation and the hue of a high-luminance component as other types of feature information may be employed. This is because outdoor green of vegetation tends to be higher in color saturation than indoor green of a fluorescent lamp, and a high-luminance component in an image signal is readily influenced by a light source and tends to have a green hue indoors. By using these a plurality of information as feature information, the precision of light source presumption can be further increased.

Not only outdoor light and indoor light are discriminated, but also three or more types of light source information may be presumed.

Third Embodiment

Figure 13:
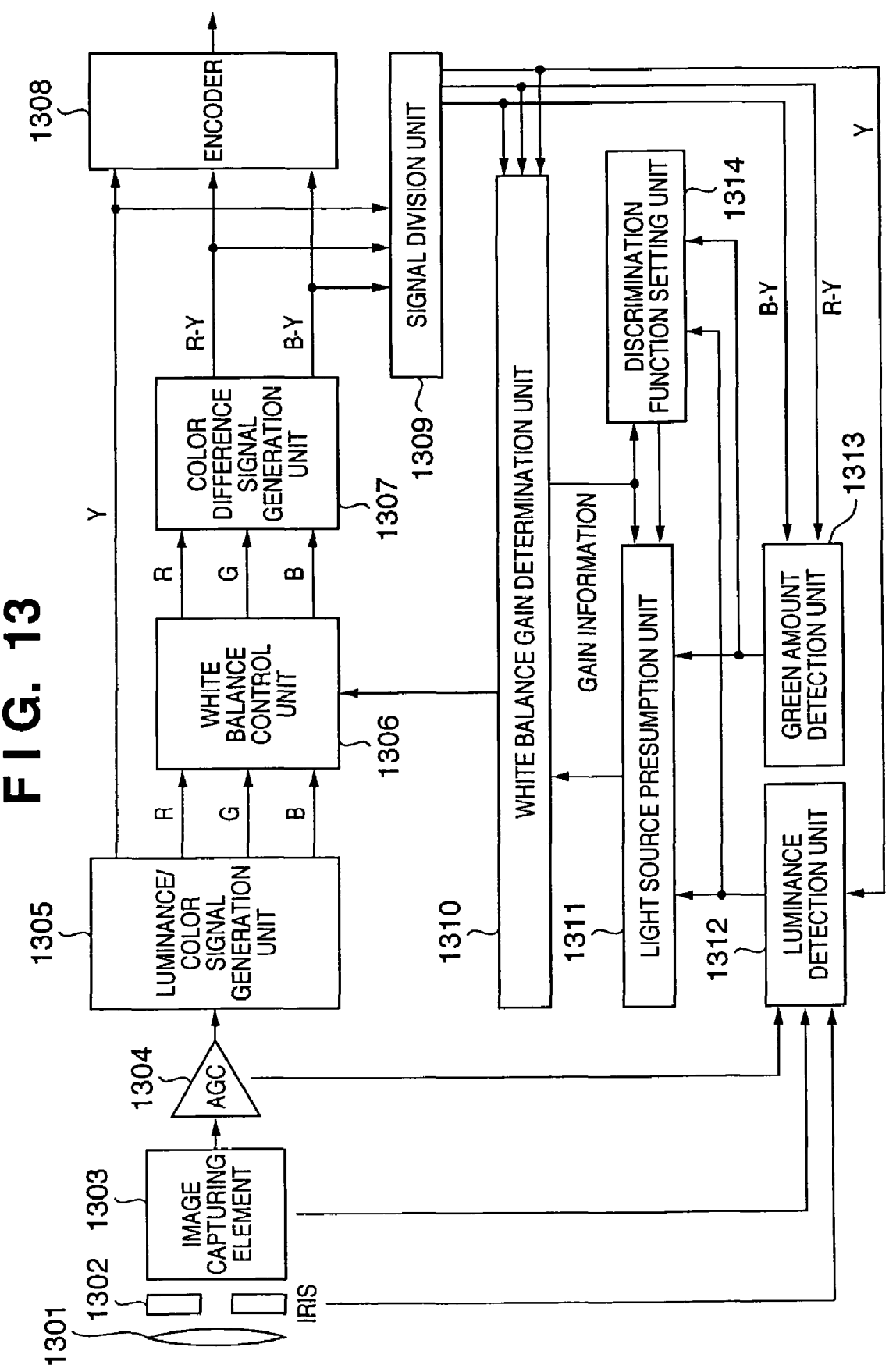
FIG. 13 is a block diagram showing the configuration of an image processing apparatus according to the third embodiment.

The third embodiment is directed to an example in which the discrimination boundary (discrimination function) in the first embodiment can be dynamically changed. FIG. 13 is a block diagram showing an example of the configuration of an image processing apparatus according to the third embodiment. In FIG. 13, building components from a lens 1301 to a green amount detection unit 1313 are identical to those from the lens 101 to the green amount detection unit 113 in FIG. 1 according to the first embodiment, and a detailed description thereof will be omitted.

Reference numeral 1314 denotes a discrimination function setting unit which sets a discrimination function, and receives illuminance information of an object from the luminance detection unit 1312, a green amount from the green amount detection unit 1313, and white balance gain information from the white balance gain determination unit 1310.

The image processing apparatus according to the third embodiment has an auto mode, landscape mode, sports mode, and indoor mode as photographing modes for controlling exposure in accordance with the photographing scene. The photographing mode can be set by menu operation with a mode dial (not shown).

Process operation in the image processing apparatus according to the third embodiment will be explained. When the photographing mode is the auto mode, the white balance gain is controlled by the same method as that in the first embodiment. More specifically, a light source is presumed by the light source presumption unit 1311 on the basis of captured image data, and a white balance gain corresponding to the light source is determined by the white balance gain determination unit 1310.

When the photographing mode is one other than the auto mode, a light source is presumed in accordance with the photographing mode. More specifically, when the photographing mode is a mode in which the photographing environment is limited to an outdoor one, like the landscape mode and sports mode, light source information output from the light source presumption unit 1311 always represents an outdoor light source. When the photographing mode is the indoor mode, light source information output from the light source presumption unit 1311 always represents an indoor light source. The discrimination function is set again in accordance with the photographing mode.

Figure 14:
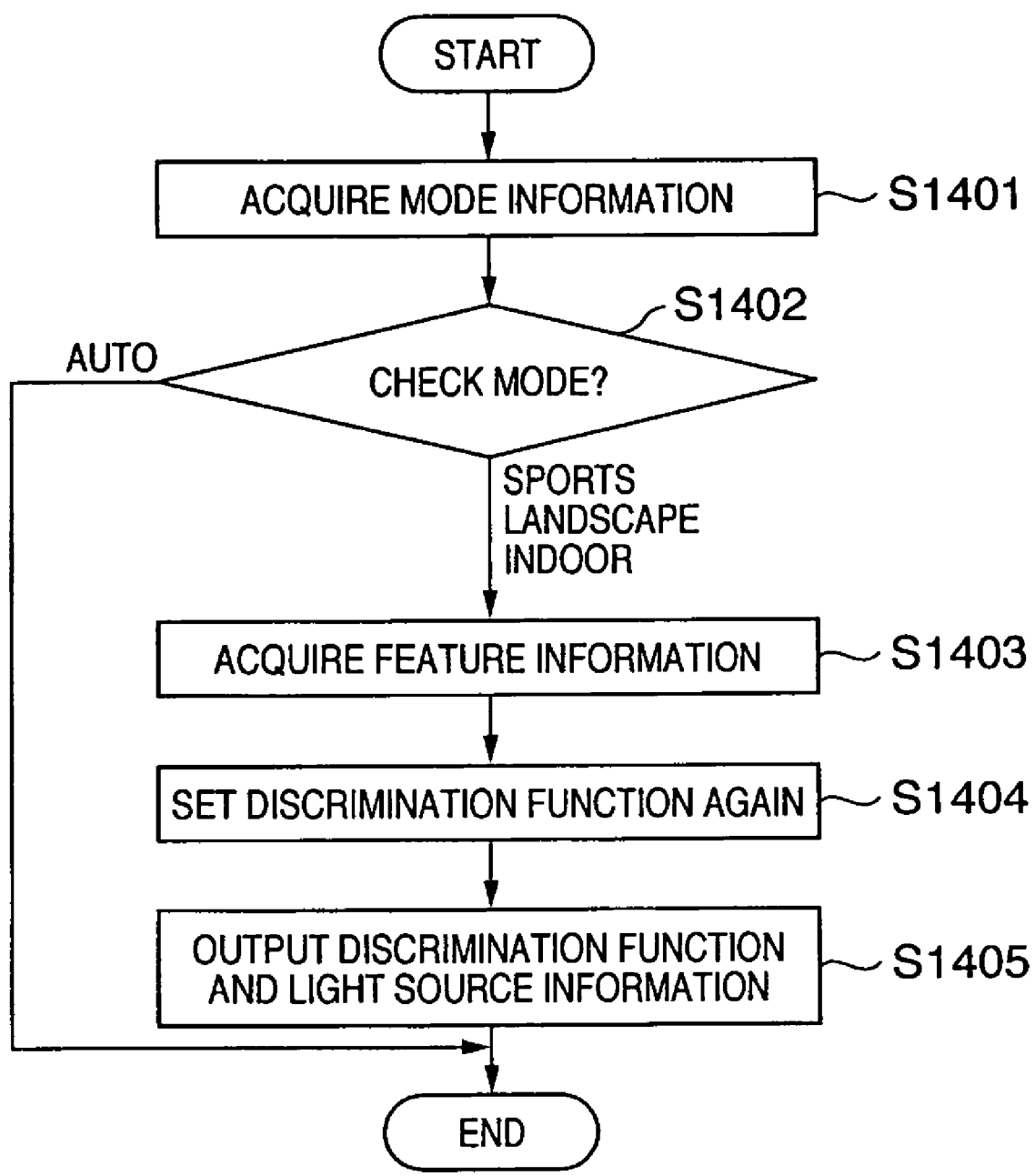
FIG. 14 is a flowchart for explaining process operation by a discrimination function setting unit.

Process operation by the discrimination function setting unit 1314 will be explained with reference to the flowchart of FIG. 14. A photographing mode is acquired (step S1401), and it is checked whether the photographing mode is the auto mode (step S1402). For the auto mode, the flow ends without performing any process. For a photographing mode (e.g., sports mode, landscape mode, or indoor mode) in which the type (outdoor or indoor) of light source can be specified, three types of feature information: the illuminance, green amount, and R-Gain are acquired (step S1403).

Figure 15A:
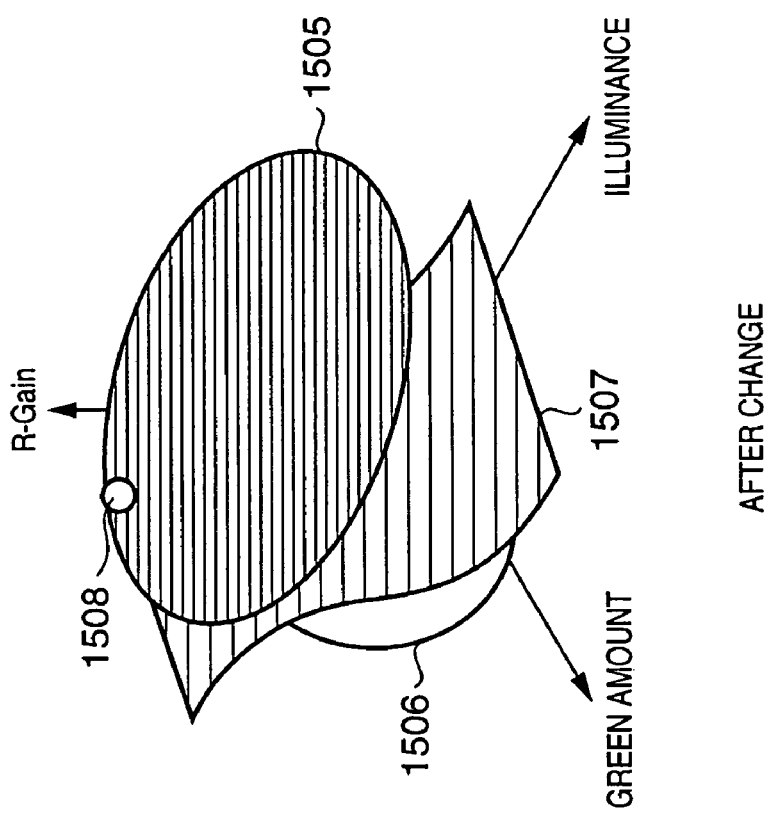
FIGS. 15A and 15B are graphs showing the distributions of outdoor light and indoor light in a three-dimensional coordinate system whose coordinate axes are the illuminance, green amount, and R-Gain.
Figure 15B:
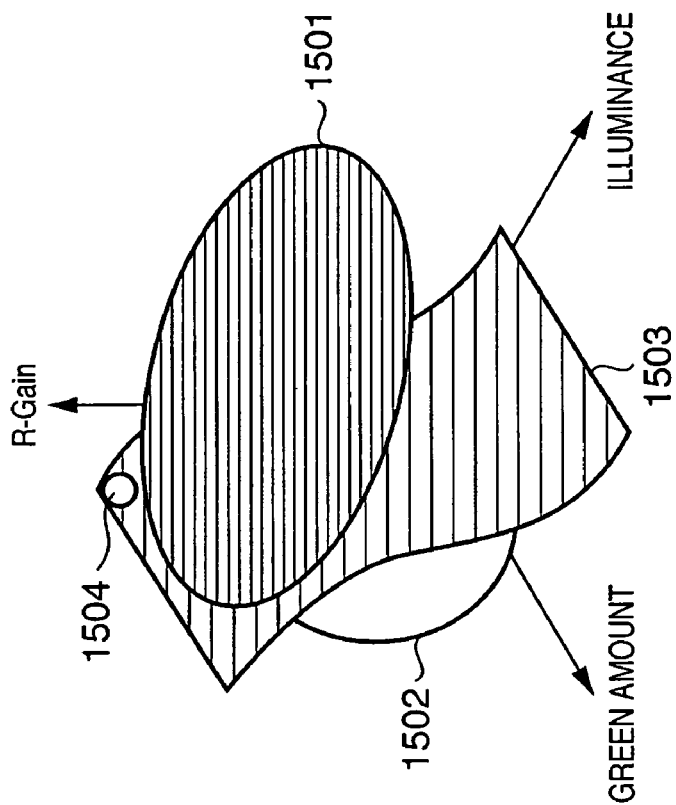
Figure 17A:
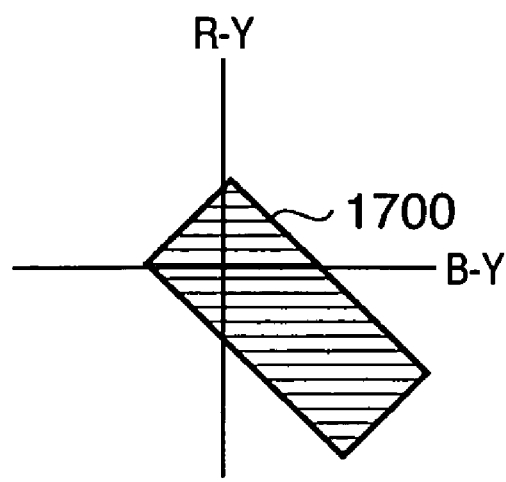
FIGS. 17A and 17B are graphs each showing a white extraction range corresponding to the type of light source.
Figure 17B:
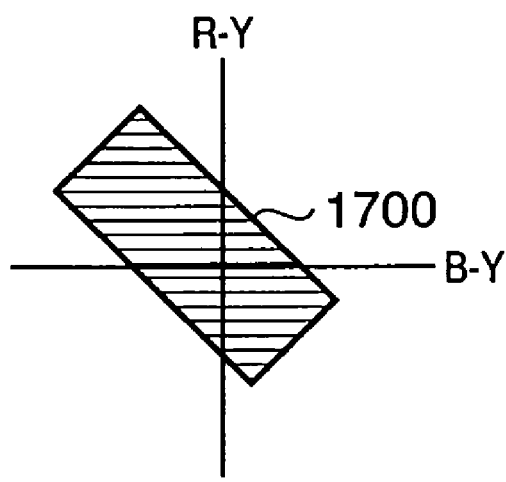

The discrimination function is changed (set again) on the basis of these newly acquired a plurality of feature information (step S1404). FIGS. 15A and 15B show states before and after the discrimination function is changed. In FIGS. 15A and 15B, reference numerals 1501 and 1505 denote distributions for the outdoor sunshine/shade before and after the change; 1502 and 1506, distributions for the indoor fluorescent lamp before and after the change; 1503 and 1507, discrimination boundaries before and after the change; and 1504 and 1508, feature points obtained upon photographing.

For example, if it is determined in step S1402 that the photographing mode is the sports mode, a plurality of feature information (illuminance, green amount, and R-Gain) are acquired in step S1403. The sports mode is used outdoors, and a feature point which is classified into outdoor light is obtained. The feature point corresponds to the position 1504 in the three-dimensional coordinate system. The distribution of outdoor light changes to the distribution 1505 in accordance with the feature point 1504 which is newly classified into outdoor light.

In step S1404, a discriminant analysis of discriminating the distribution 1506 of indoor light from the distribution 1505 of outdoor light that has been changed by the new feature point 1504 is executed, and the discrimination function representing the discrimination boundary is calculated again. The recalculated discrimination function is changed in constant parameters $\alpha_0$ to $\alpha_9$ in equation (1) described in the first embodiment. The resultant discrimination boundary is indicated by 1507 in FIG. 15B.

The updated discrimination function is sent to the light source presumption unit 1311 (step S1405). The light source presumption unit 1311 receives the updated discrimination function, and uses it when the photographing mode changes to the auto mode.

In this manner, when information which can reliably specify a light source is obtained, the discrimination boundary (discrimination function) can be changed on the basis of the distribution of feature information in this state to reduce a discrimination error by the light source presumption unit 1311 in the auto mode.

A discrimination function resetting process is executed at a predetermined time interval or a timing when, e.g., the mode is switched, so as to prevent localization of the feature distribution in a specific environment.

The photographing mode is not limited to those described in the third embodiment. In the process of step S1402 in FIG. 14, the photographing mode is classified into the auto mode or the remaining modes. Alternatively, the photographing mode may be classified into photographing modes (sports mode and indoor mode) in which an outdoor or indoor light source can be specified or photographing modes (auto photographing mode and portrait mode) in which an outdoor or indoor light source cannot be specified.

The third embodiment has exemplified the photographing mode as an element which specifies a light source, but another method, e.g., a method of intentionally designating a light source by the user may be adopted. The updated discrimination function may be returned to an initial setting by user operation.

The first to third embodiments use the green hue region, but another hue region which is determined to be achromatic owing to misjudgement of a light source when the light source is presumed on the basis of illuminance information.

The object of the present invention is achieved even by supplying a storage medium which stores software program codes to implement the functions of the above-described embodiments to the system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium to supply the program codes, for example, a floppy disk, hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OS (basic system or operating system) running on the computer performs part or some of actual processes on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or some of actual processes on the basis of the instructions of the program codes.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2004-366468 filed Dec. 17, 2004, which is hereby incorporated by reference herein.

What is claimed is:

1. An image processing apparatus comprising: a light source presumption unit adapted to presume a light source on the basis of a plurality of feature information including illuminance information of current image signals obtained by image capturing, information of signals belonging to a hue region of a predetermined color among the current image signals, and information of a color temperature associated with previous image signals obtained by image capturing which are fed back to a white balance control unit before the current image signals; and said white balance control unit adapted to perform white balance control in accordance with light source information presumed by said light source presumption unit, wherein said light source presumption unit presumes the light source using both the relationship between the information of the color temperature and the illuminance information and the relationship between the information of the color temperature and the information of signals belonging to the hue region.

2. The apparatus according to claim 1, wherein typesof light sources presumed by said light source presumption unit are outdoor light and indoor light.

3. The apparatus according to claim 1, wherein the hue region of the predetermined color is a hue region corresponding to a color of a predetermined light source to be presumed.

4. The apparatus according to claim 1, wherein the information of the signals belonging to the hue region of the predetermined color among the current image signals is at least one of an amount of signals belonging to the hue region of the predetermined color among image signals, an average luminance of signals belonging to the hue region of the predetermined color among the image signals, and an average color saturation of signals belonging to the hue region of the predetermined color among the image signals.

5. The apparatus according to claim 1, wherein the predetermined color is green.

6. The apparatus according to claim 1, wherein the feature information includes information of signals belonging to a predetermined luminance level among image signals.

7. The apparatus according to claim 6, wherein the information of the signals belonging to the predetermined luminance level among the image signals is at least one of an average hue of signals belonging to a luminance level higher than a predetermined value among the image signals, and an average color saturation of signals belonging to the luminance level higher than the predetermined value among the image signals.

8. The apparatus according to claim 1, wherein information serving as the information of the color temperature is white balance gain information used in said control unit.

9. The apparatus according to claim 1, wherein said presumption unit presumes a light source on the basis of a feature distribution of each light source in a multidimensional coordinate system whose coordinate axes are the a plurality of feature information including the illuminance information.

10. The apparatus according to claim 9, wherein said presumption unit sets a discrimination boundary which divides the multidimensional coordinate system into respective types of light sources, and presumes a light source on the basis of the discrimination boundary.

11. The apparatus according to claim 10, wherein said presumption unit uses a discrimination function which expresses the discrimination boundary by a formula.

12. The apparatus according to claim 10, further comprising a discrimination function setting unit adapted to set again the discrimination boundary when information capable of specifying a light source is obtained.

13. The apparatus according to claim 1, further comprising an image capturing element adapted to photoelectrically convert incident light, wherein a signal from said image capturing element is input to said control unit.

14. An image processing method comprising:
   a light source presumption step of presuming a light source on the basis of a plurality of feature information including illuminance information of current image signals obtained by image capturing, information of signals belonging to a hue region of a predetermined color among the current image signals, and information of a color temperature associated with previous image signals obtained by image capturing which are fed back to a white balance control unit before the current image signals; and
   said white balance control step of performing white balance control in accordance with light source information presumed in the light source presumption step, wherein said light source presumption step the light source is presumed using both the relationship between the information of the color temperature and the illuminance information and the relationship between the information of the color temperature and the information of signals belonging to the hue region.

15. A computer-readable medium containing a computer program for causing a computer to execute
   a presumption process of presuming a light source on the basis of a plurality of feature information including illuminance information of current image signals obtained by image capturing, information of signals belonging to a hue region of a predetermined color among the current image signals, and information of a color temperature associated with previous image signals obtained by image capturing which are fed back to a white balance control unit before the current image signals, and
   a control process of performing white balance control in accordance with light source information presumed in the light source presumption process, wherein said light source presumption process the light source is presumed using both the relationship between the information of the color temperature and the illuminance information and the relationship between the information of the color temperature and the information of signals belonging to the hue region.

* * * * *